United States Patent
Friend et al.

(10) Patent No.: US 7,962,622 B2
(45) Date of Patent: Jun. 14, 2011

(54) SYSTEM AND METHOD FOR PROVIDING PROVISIONING AND UPGRADE SERVICES FOR A WIRELESS DEVICE

(75) Inventors: John Friend, Los Altos, CA (US); Michael Belshe, Sunnyvale, CA (US); David Hoffman, Menlo Park, CA (US)

(73) Assignee: Motorola Mobility, Inc., Libertyville, IL (US)

( * ) Notice: Subject to any disclaimer, the term of this patent is extended or adjusted under 35 U.S.C. 154(b) by 1943 days.

(21) Appl. No.: 10/400,970

(22) Filed: Mar. 27, 2003

(65) Prior Publication Data

US 2004/0006630 A1    Jan. 8, 2004

Related U.S. Application Data

(63) Continuation-in-part of application No. 10/109,928, filed on Mar. 29, 2002, now Pat. No. 7,243,163, which is a continuation-in-part of application No. 09/924,283, filed on Aug. 7, 2001, now Pat. No. 7,155,483.

(51) Int. Cl.
    *G06F 15/16* (2006.01)
(52) U.S. Cl. .................... 709/227; 726/4
(58) Field of Classification Search .......... 709/206, 709/227, 228, 242; 726/3, 4
    See application file for complete search history.

(56) References Cited

U.S. PATENT DOCUMENTS

| | | | |
|---|---|---|---|
| 4,682,150 A | 7/1987 | Mathes | |
| 5,049,881 A | 9/1991 | Gibson et al. | |
| 5,115,392 A | 5/1992 | Takamoto et al. | |
| 5,126,739 A | 6/1992 | Whiting et al. | |
| 5,159,592 A | 10/1992 | Perkins | |
| 5,321,840 A | 6/1994 | Ahlin et al. | |
| 5,469,161 A | 11/1995 | Bezek | |
| 5,521,597 A | 5/1996 | Dimitri | |
| 5,553,281 A | 9/1996 | Brown et al. | |
| 5,559,800 A | 9/1996 | Mousseau et al. | |
| 5,563,595 A | 10/1996 | Strohacker | |
| 5,666,530 A | 9/1997 | Clark et al. | |
| 5,715,387 A | 2/1998 | Barnstijn et al. | |
| 5,727,159 A | 3/1998 | Kikinis | |
| 5,727,202 A | 3/1998 | Kucala | |

(Continued)

FOREIGN PATENT DOCUMENTS

EP    0909037 A1    4/1999

(Continued)

OTHER PUBLICATIONS

Stefan G. Hild and Peter Robinson, "Mobilizing Applications", IEEE Personal Communications, Oct. 1997, XP-000721303, pp. 26-34.

(Continued)

*Primary Examiner* — Douglas B Blair
(74) *Attorney, Agent, or Firm* — Blakely, Sokoloff, Taylor & Zafman LLP.

(57) ABSTRACT

In one embodiment, a system is disclosed. The system includes a wireless data processing device, a messaging service to maintain data objects on behalf of a user, and a data center, coupled to the wireless device and the messaging service. The data center establishes a plurality of routing connections between the wireless device and the messaging service. Each of the plurality of connections corresponds to a data service level authorized by the data center.

15 Claims, 7 Drawing Sheets

U.S. PATENT DOCUMENTS

| | | | |
|---|---|---|---|
| 5,760,716 A | 6/1998 | Mathews et al. | |
| 5,771,010 A | 6/1998 | Masenas | |
| 5,790,974 A | 8/1998 | Tognazzini | |
| 5,793,970 A | 8/1998 | Fakes et al. | |
| 5,802,312 A | 9/1998 | Lazaridis et al. | |
| 5,838,923 A | 11/1998 | Lee et al. | |
| 5,841,376 A | 11/1998 | Hayashi | |
| 5,870,610 A | 2/1999 | Beyda | |
| 5,875,329 A | 2/1999 | Shan | |
| 5,903,230 A | 5/1999 | Masenas | |
| 5,930,471 A | 7/1999 | Milewski et al. | |
| 5,961,590 A | 10/1999 | Mendez et al. | |
| 5,974,238 A | 10/1999 | Chase, Jr. | |
| 5,987,464 A | 11/1999 | Schneider | |
| 6,003,089 A | 12/1999 | Shaffer et al. | |
| 6,023,708 A | 2/2000 | Mendez et al. | |
| 6,034,621 A | 3/2000 | Kaufman | |
| 6,052,735 A | 4/2000 | Ulrich et al. | |
| 6,065,017 A | 5/2000 | Barker | |
| 6,085,185 A | 7/2000 | Matsuzawa et al. | |
| 6,104,392 A | 8/2000 | Shaw et al. | |
| 6,111,707 A | 8/2000 | Busddecke et al. | |
| 6,151,606 A | 11/2000 | Mendez | |
| 6,182,117 B1 | 1/2001 | Christie et al. | |
| 6,188,695 B1 | 2/2001 | Przybysz | |
| 6,216,157 B1 | 4/2001 | Vishwanath et al. | |
| 6,218,970 B1 | 4/2001 | Jaquette | |
| 6,219,694 B1 | 4/2001 | Lazaridis et al. | |
| 6,226,618 B1 | 5/2001 | Downs et al. | |
| 6,259,891 B1 | 7/2001 | Allen | |
| 6,275,848 B1 | 8/2001 | Arnold | |
| 6,279,001 B1 | 8/2001 | DeBettencourt et al. | |
| 6,282,294 B1 * | 8/2001 | Deo et al. | 380/270 |
| 6,304,881 B1 | 10/2001 | Halim et al. | |
| 6,310,889 B1 | 10/2001 | Parsons et al. | |
| 6,330,618 B1 | 12/2001 | Hawkins et al. | |
| 6,343,299 B1 | 1/2002 | Huang et al. | |
| 6,347,340 B1 | 2/2002 | Coelho et al. | |
| 6,360,272 B1 | 3/2002 | Lincke et al. | |
| 6,384,850 B1 | 5/2002 | McNally et al. | |
| 6,393,434 B1 | 5/2002 | Huang et al. | |
| 6,396,482 B1 | 5/2002 | Griffin et al. | |
| 6,401,136 B1 | 6/2002 | Britton et al. | |
| 6,430,601 B1 | 8/2002 | Eldridge et al. | |
| 6,449,622 B1 | 9/2002 | LaRue et al. | |
| 6,457,062 B1 | 9/2002 | Pivowar et al. | |
| 6,460,055 B1 | 10/2002 | Midgley et al. | |
| 6,463,463 B1 | 10/2002 | Godfrey et al. | |
| 6,463,464 B1 | 10/2002 | Lazaridis et al. | |
| 6,477,543 B1 | 11/2002 | Huang et al. | |
| 6,505,055 B1 | 1/2003 | Kahn et al. | |
| 6,535,892 B1 | 3/2003 | LaRue et al. | |
| 6,553,037 B1 * | 4/2003 | Pivowar et al. | 370/463 |
| 6,571,245 B2 | 5/2003 | Huang et al. | |
| 6,604,236 B1 | 8/2003 | Draper et al. | |
| 6,615,246 B2 * | 9/2003 | Pivowar et al. | 709/214 |
| 6,615,253 B1 | 9/2003 | Bowman-Amuah | |
| 6,625,621 B2 | 9/2003 | Tan et al. | |
| 6,628,934 B2 | 9/2003 | Rosenberg et al. | |
| 6,636,873 B1 | 10/2003 | Carini et al. | |
| 6,640,244 B1 | 10/2003 | Bowman-Amuah | |
| 6,654,746 B1 | 11/2003 | Wong et al. | |
| 6,658,167 B1 | 12/2003 | Lee et al. | |
| 6,671,757 B1 | 12/2003 | Multer et al. | |
| 6,675,203 B1 | 1/2004 | Herrod et al. | |
| 6,694,335 B1 | 2/2004 | Hopmann et al. | |
| 6,697,458 B1 | 2/2004 | Kunjibettu | |
| 6,701,378 B1 | 3/2004 | Gilhuly et al. | |
| 6,721,787 B1 | 4/2004 | Hiscock | |
| 6,721,871 B2 | 4/2004 | Piispanen et al. | |
| 6,732,105 B1 * | 5/2004 | Watson et al. | 707/10 |
| 6,757,698 B2 | 6/2004 | McBride et al. | |
| 6,779,019 B1 | 8/2004 | Mousseau et al. | |
| 6,792,085 B1 | 9/2004 | Rigaldies et al. | |
| 6,810,405 B1 | 10/2004 | LaRue et al. | |
| 6,850,757 B2 * | 2/2005 | Watanabe et al. | 455/412.2 |
| 6,874,029 B2 | 3/2005 | Hutcheson et al. | |
| 6,874,037 B1 | 3/2005 | Abram et al. | |
| 6,901,415 B2 | 5/2005 | Thomas et al. | |
| 6,907,243 B1 | 6/2005 | Patel | |
| 6,931,454 B2 | 8/2005 | Deshpande et al. | |
| 6,934,766 B1 | 8/2005 | Russell | |
| 6,941,348 B2 | 9/2005 | Petry et al. | |
| 6,941,349 B2 | 9/2005 | Godfrey et al. | |
| 6,947,738 B2 * | 9/2005 | Skog et al. | 455/426.1 |
| 6,954,789 B2 | 10/2005 | Dietz et al. | |
| 6,957,077 B2 * | 10/2005 | Dehlin | 455/466 |
| 6,973,299 B2 | 12/2005 | Apfel | |
| 6,983,308 B1 | 1/2006 | Oberhaus et al. | |
| 7,003,776 B2 | 2/2006 | Sutherland | |
| 7,010,303 B2 * | 3/2006 | Lewis et al. | 455/445 |
| 7,016,700 B2 * | 3/2006 | Takahashi et al. | 455/550.1 |
| 7,085,809 B2 | 8/2006 | Mori et al. | |
| 7,092,699 B1 | 8/2006 | Hefter | |
| 7,103,656 B2 * | 9/2006 | Lewis et al. | 709/223 |
| 7,136,934 B2 | 11/2006 | Carter et al. | |
| 7,138,934 B2 | 11/2006 | Melanson | |
| 7,139,555 B2 | 11/2006 | Apfel | |
| 7,149,813 B2 | 12/2006 | Flanagin et al. | |
| 7,184,999 B1 * | 2/2007 | Watson et al. | 707/2 |
| 7,203,477 B2 * | 4/2007 | Coppinger et al. | 455/403 |
| 7,203,485 B2 * | 4/2007 | Coppinger et al. | 455/418 |
| 7,243,163 B1 | 7/2007 | Friend et al. | |
| 7,287,097 B1 | 10/2007 | Friend et al. | |
| 7,313,385 B2 | 12/2007 | Yabe et al. | |
| 7,509,376 B2 | 3/2009 | Mousseau et al. | |
| 7,596,565 B2 | 9/2009 | Friend et al. | |
| 7,743,119 B2 | 6/2010 | Friend et al. | |
| 7,817,981 B2 * | 10/2010 | Coppinger et al. | 455/403 |
| 7,822,410 B2 * | 10/2010 | Coppinger et al. | 455/419 |
| 7,835,951 B1 * | 11/2010 | Burger et al. | 705/28 |
| 2001/0004741 A1 | 6/2001 | Lazaridis et al. | |
| 2001/0005864 A1 | 6/2001 | Mousseau et al. | |
| 2001/0010059 A1 | 7/2001 | Burman et al. | |
| 2001/0034654 A1 | 10/2001 | Vigil et al. | |
| 2001/0051996 A1 * | 12/2001 | Cooper et al. | 709/217 |
| 2001/0051998 A1 | 12/2001 | Henderson | |
| 2001/0054115 A1 | 12/2001 | Ferguson et al. | |
| 2002/0013853 A1 | 1/2002 | Baber et al. | |
| 2002/0016818 A1 | 2/2002 | Kirani et al. | |
| 2002/0019225 A1 | 2/2002 | Miyashita | |
| 2002/0032722 A1 | 3/2002 | Baynes, Jr. et al. | |
| 2002/0046286 A1 | 4/2002 | Caldwell et al. | |
| 2002/0116465 A1 * | 8/2002 | Kim et al. | 709/206 |
| 2002/0119793 A1 | 8/2002 | Hronek et al. | |
| 2002/0120696 A1 | 8/2002 | Mousseau et al. | |
| 2002/0146240 A1 | 10/2002 | Ogawa et al. | |
| 2002/0160773 A1 | 10/2002 | Gresham et al. | |
| 2003/0046434 A1 | 3/2003 | Flanagin et al. | |
| 2003/0050046 A1 | 3/2003 | Conneely et al. | |
| 2003/0069842 A1 | 4/2003 | Kight et al. | |
| 2003/0069848 A1 * | 4/2003 | Larson et al. | 705/50 |
| 2003/0081621 A1 | 5/2003 | Godfrey et al. | |
| 2003/0097381 A1 | 5/2003 | Detweiler et al. | |
| 2004/0049599 A1 | 3/2004 | Friend et al. | |
| 2004/0054739 A1 | 3/2004 | Friend et al. | |
| 2004/0088546 A1 * | 5/2004 | Shah et al. | 713/168 |
| 2004/0105423 A1 | 6/2004 | Koehler et al. | |
| 2004/0109436 A1 | 6/2004 | Vargas et al. | |
| 2004/0181591 A1 | 9/2004 | Yu et al. | |
| 2004/0213283 A1 | 10/2004 | Ohkubo et al. | |
| 2005/0148356 A1 | 7/2005 | Ferguson et al. | |
| 2006/0112427 A1 * | 5/2006 | Shahbazi | 726/16 |
| 2007/0130315 A1 * | 6/2007 | Friend et al. | 709/223 |
| 2007/0239898 A1 | 10/2007 | Friend et al. | |
| 2007/0266107 A1 | 11/2007 | Friend et al. | |
| 2008/0301231 A1 | 12/2008 | Mehta et al. | |

FOREIGN PATENT DOCUMENTS

| | | |
|---|---|---|
| EP | 0917077 A2 | 5/1999 |
| EP | 1014629 | 6/2000 |
| EP | 0666651 B1 | 7/2000 |
| JP | 07-182263 A | 7/1995 |
| JP | 10-269125 A | 10/1998 |
| JP | 11-136365 A | 5/1999 |
| JP | 2001-053785 A | 2/2001 |
| JP | 2001-076040 A | 3/2001 |

| WO | 0067158 A2 | 11/2000 |
| WO | 0178342 A2 | 10/2001 |
| WO | 0219626 A2 | 3/2002 |
| WO | 02086954 A1 | 10/2002 |
| WO | 03007482 A1 | 1/2003 |
| WO | 03015362 A1 | 2/2003 |
| WO | 03083667 A1 | 10/2003 |

OTHER PUBLICATIONS

European Patent Office, "Supplementary European Search Report" for Application No. 03719504.7 (PCT/US2003/09576); Aug. 22, 2006; 4 pages.

United States Patent and Trademark Office, "Non-Final Office Action" for U.S. Appl. No. 09/924,283, Mar. 21, 2005, 11 pages.

United States Patent and Trademark Office, "Final Office Action" for U.S. Appl. No. 09/924,283, Sep. 7, 2005, 13 pages.

United States Patent and Trademark Office, "Non-Final Office Action" for U.S. Appl. No. 09/924,283, Apr. 10, 2006, 18 pages.

United States Patent and Trademark Office, "System and Method for Full Wireless Synchronization of a Data Processing Apparatus with a Messaging Service", U.S. Appl. No. 10/348,281 filed Jan. 21, 2003, 107 pages.

* cited by examiner

SYSTEM AND METHOD FOR PROVIDING PROVISIONING AND UPGRADE SERVICES FOR A WIRELESS DEVICE

PRIORITY

This application is a continuation-in-part of U.S. application entitled SYSTEM AND METHOD FOR FULL WIRELESS SYNCHRONIZATION OF A DATA PROCESSING APPARATUS WITH A DATA SERVICE, application Ser. No. 10/109,928, filed Mar. 29, 2002 now U.S. Pat. No. 7,243,163, which is a continuation-in-part of U.S. application entitled APPARATUS AND METHOD FOR CONSERVING BANDWIDTH BY BATCH PROCESSING DATA TRANSACTIONS, application Ser. No. 09/924,283, filed Aug. 7, 2001 now U.S. Pat. No. 7,155,483.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

This invention relates generally to the field of network data services. More particularly, the invention relates to an apparatus and method for synchronizing a wireless data processing device with a wireless messaging service.

BACKGROUND

A variety of wireless data processing devices have been introduced over the past several years. These include wireless personal digital assistants ("PDAs") such as the Palm® VIIx handheld, cellular phones equipped with data processing capabilities (e.g., those which include wireless application protocol ("WAP") support), and, more recently, wireless messaging devices such as the Blackberry™ wireless pager developed by Research In Motion ("RIM").™

Personal digital assistants such as the Palm devices typically provide only limited wireless messaging capabilities (e.g., instant messaging and basic Internet access). For example, these devices typically require a user to manually establish a connection to the Internet via an Internet Service Provider ("ISP") or to a corporate server to check e-mail messages.

Although corporate messaging systems such as the RIM Blackberry provide more comprehensive messaging capabilities, there are significant limitations to these systems. Specifically, these systems employ e-mail "redirection" or "forwarding" techniques in which messages are redirected to the wireless device only if certain conditions are met. These conditions, referred to as "redirection events," may include, for example, an indication that the user is not working at his corporate desktop (e.g., removal of the wireless device from the desktop cradle, a screen saver firing on the desktop, . . . etc) or a manual redirection command initiated by the user (e.g., via the wireless device or the corporate desktop). One such message redirection system is described in U.S. Pat. No. 6,219,694 ("System and Method for Pushing Information From a Host System to a Mobile Data Communication Device Having a Shared Electronic Address").

As a result, these systems are (as a practical matter) incapable of providing complete synchronization between the wireless device and the corporate e-mail database. For example, because messages are only redirected to the wireless device under certain conditions (e.g., following a redirection event), at any given point in time, the wireless device may contain an incomplete set of e-mail data. Moreover, even when messages are actively being forwarded to the wireless device, the e-mail data stored at the wireless device and the e-mail database are not truly synchronized. For example, certain types of transactions performed on the wireless device, such as an indication that a message has been viewed by the user, message deletions, movement of messages from one folder to another, . . . etc., are not updated at the e-mail service wirelessly.

Moreover, only basic e-mail functions such as sending and receiving messages may be controlled at the wireless device. More advanced e-mail management functions must be set at the user's desktop (e.g., configuring e-mail filters, outgoing e-mail signatures, security settings such as passwords, . . . etc).

In addition, prior messaging systems require a corporate desktop to which the device must be attached when the user is in the office. The problem with this is not merely that a corporate desktop is required, but also that the corporate desktop must be configured with software and a proprietary "cradle" that allows it to communicate directly to the wireless device.

Accordingly, what is needed is a system and method for providing complete synchronization and management between a wireless device and a messaging service (e.g., a corporate e-mail account). What is also needed is a wireless apparatus for receiving and sending e-mail messages, which does not require a corporate desktop or any software to be installed and executed on the corporate desktop.

SUMMARY

According to one embodiment, a method is described. The method includes receiving identification (ID) information from a messaging service at a data center to initiate a wireless data service between the messaging service and a wireless device. The method also includes the data center establishing one or more routing connections between the wireless device and the messaging service. Each of the one or more routing connections corresponds to a data service component authorized by the data center.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

An Exemplary Network Architecture

Figure 1:
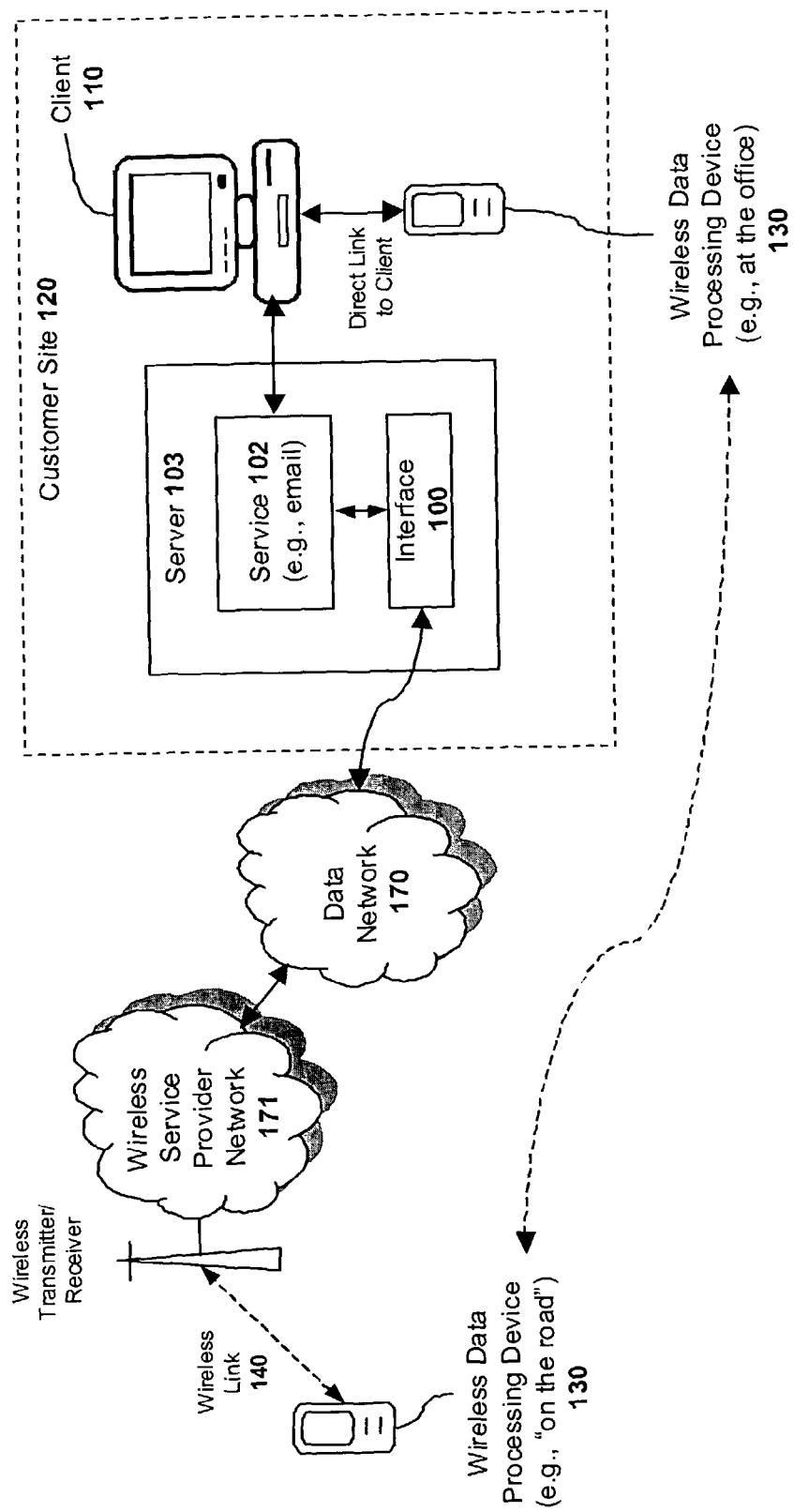
FIG. 1 illustrates an exemplary network architecture used to implement elements of the present invention.

FIG. 1 illustrates one embodiment of a network architecture. A "customer site" 120 illustrated in FIG. 1 may be any local-area or wide-area network over which a plurality of servers 103 and clients 110 communicate. For example, customer site 120 may include all servers and clients maintained by a single corporation.

Servers 103 may be configured to provide a variety of different messaging and groupware services 102 to network users (e.g., e-mail, instant messaging, calendaring, ... etc). In one embodiment, these services are provided by Microsoft Exchange.™ However, the underlying principles of the invention are not limited to any particular messaging/groupware platform.

In one embodiment, an interface 100 forwards data objects maintained by service 102 (e.g., e-mail messages, instant messages, calendar data, ... etc) to a plurality of wireless data processing devices (represented in FIG. 1 by wireless device 130) via an external data network 170 and/or a wireless service provider network 171. For example, if the service 102 includes an e-mail database, the interface 100 transmits any new e-mails, which arrive in a user's mailbox on the service 102 to the user's wireless data processing device 130 (over the network(s) 170 and/or 171).

Alternatively, or in addition, the service 102 may provide the e-mail to the user's local computer (e.g., client 110) upon request (i.e., so that the user will receive the e-mail on his/her wireless device 130 when out of the office and on his/her personal computer 110 when in the office). Conversely, e-mail messages sent from the user's wireless data processing device 130 are transmitted to the service 102 via the interface 100.

In one embodiment, the interface 100 is a software module adapted to work with the particular service 102. It should be noted, however, that interface 100 may be implemented in hardware or any combination of hardware and software while still complying with the underlying principles of the invention.

In one embodiment, the external data network 170 is comprised of a plurality of databases, servers/clients (not shown) and other networking hardware (e.g., routers, hubs, ... etc) for transmitting data between the interface 100 and the wireless devices 130. In one embodiment, the interface 100 encapsulates data in one or more packets containing an address identifying the wireless devices 130 (e.g., such as a 24-bit Mobitex Access Number ("MAN #")).

The external data network 170 transmits the packets to a wireless service provider network 171, which in turn, transmits the packets (or the data contained therein) over a wireless communication link to the wireless device 130. In one embodiment, the wireless service provider network is a 2-way paging network. However, various other network types may be employed (e.g., CDMA 2000, GPRS, PCS, ... etc) while still complying with the underlying principles of the invention.

It should be noted that the network service provider network 171 and the external data network 170 (and associated interface 100) may be owned/operated by the same organization or, alternatively, the owner/operator of the external data network 170 may lease wireless services from the wireless service provider network. The underlying principles of the invention are not limited to any particular service arrangement.

Service Initiation

According to one embodiment, wireless service to a device 130 is initiated by downloading software to the device 130. In such an embodiment, the device 130 is coupled directly to client 110 and initialized by installing the applicable software. The direct connection between wireless device 130 and client 110 may be a wired or wireless (e.g., Bluetooth) connection. According to a further embodiment, no further configuration is required. Particularly, the device 130 user is not required to take any further action to begin service.

Figure 2:
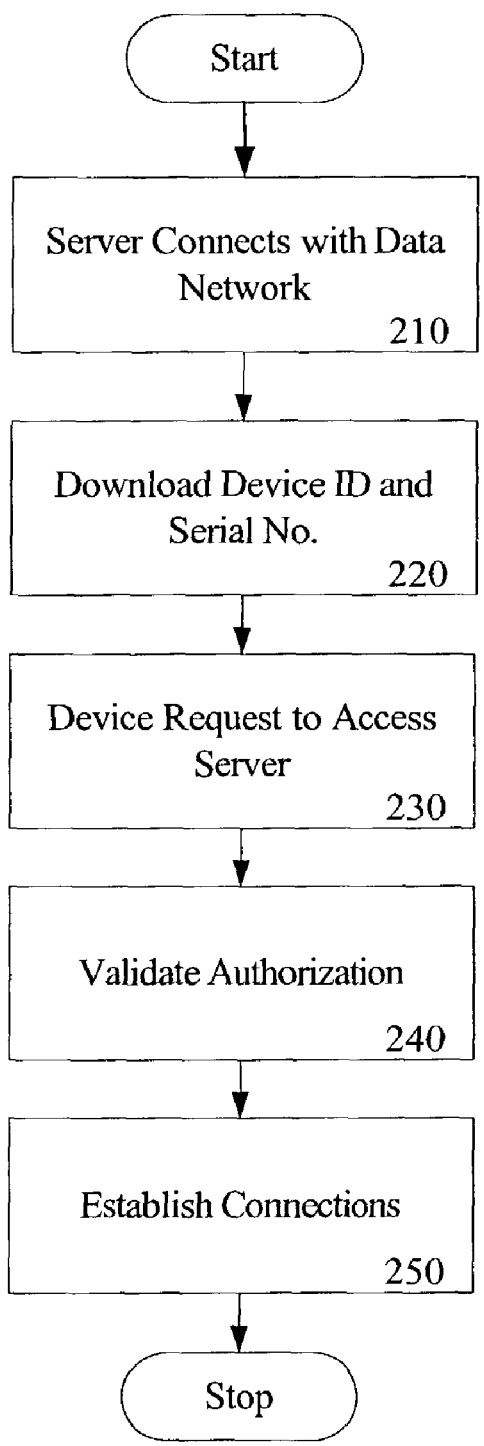
FIG. 2 illustrates one embodiment of a flow diagram for initiating service between a server and a wireless device.

FIG. 2 illustrates one embodiment of a flow diagram for initiating service between interface 100 and a wireless device 130. At processing block 210, interface 100 connects with data network 170 before the software has been downloaded to device 130. At processing block 220, interface 100 downloads a serial number for the wireless device 130 to data network 170. Thus, interface 100 indicates to data network 170 that the particular device 130 is authorized to access server 103.

Subsequently, the wireless device 130 is turned on for the first time. Thus, at processing block 230, device 130 requests data network 170 to establish a connection with server 103 by providing the network address and the serial number. At processing block 240, data network 170 compares the identification information received from the wireless device and the identification information received from interface 100 in order to validate whether the device 130 is authorized to access server 103 based upon data received from interface 100.

In addition, data network 170 compares the identification information with a valid service plan that has been previously established for the device at purchase time. Once the service for the device 103 is authorized, data network 170 establishes one or more connections between wireless device 130 and interface 100.

Figure 3:
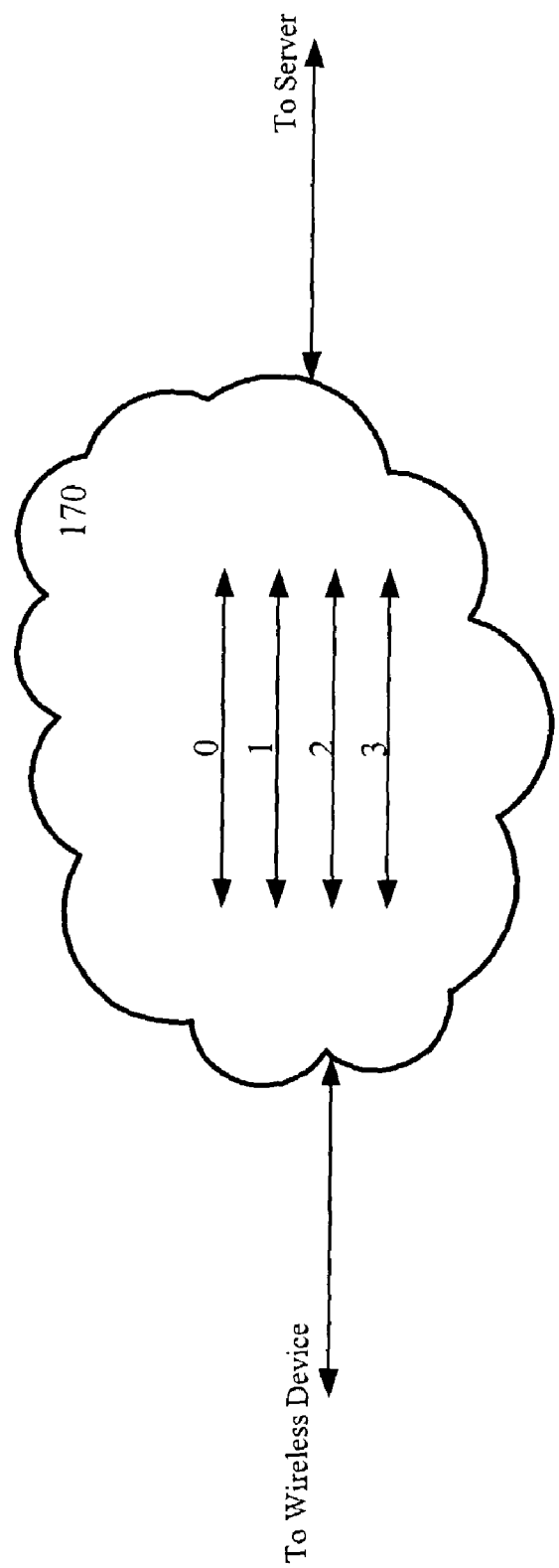
FIG. 3 illustrates one embodiment of network connections between a wireless device and a server.

According to one embodiment, a permanent connection is established at data network 170 for each type of service, e.g., email, calendar address book, etc. The connections represent routing information (e.g., a connection ID) that is in used to deliver service specific messages to and from device 130. FIG. 3 illustrates one embodiment of data network 170 routing connections between a wireless device 130 and a server 103. In the illustrated embodiment, connections 0, 1, 2 and 3 are established between wireless device 130 and a server 103.

In one embodiment, each connection within data network 170 represents a wireless service authorized by a service plan provided to data network 170. According to one embodiment, connection 0 is a channel defined to be a provisioning service that is used to establish other services The provisioning service validates the authentication of device 130 each time device 130 attempts to provision on the network. In addition, the provisioning service verifies the service plan associated with the wireless device 130.

In a further embodiment, connection 1 represents an e-mail service, connection 2 represents a calendar service and connection 3 represents an address book service. As described above, each connection stored in network 170 is permanent. Consequently, subsequent communication between device 130 and server 103 are made faster and more efficient. According to one embodiment each connection is private, thus, guaranteeing that messages are only sent or received by devices and servers that have previously established connections.

Service Adjustment

Figure 4:
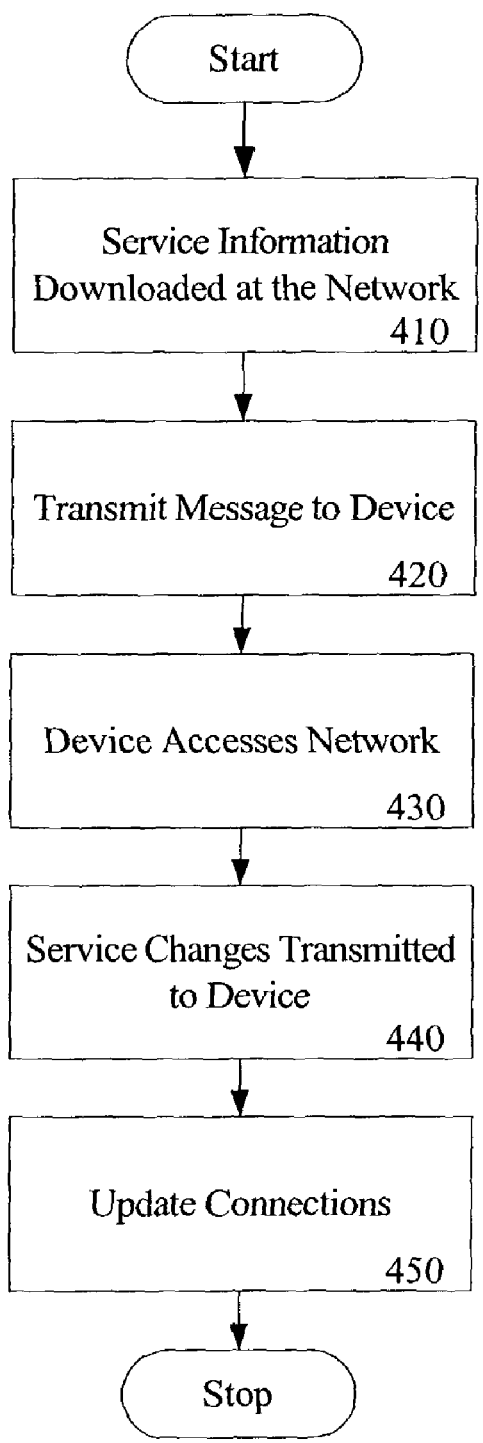
FIG. 4 is a flow diagram illustrating one embodiment of upgrading service at a wireless device.

According to one embodiment, a wireless device 130 user's service may be upgraded/downgraded without configuration of wireless device 130. Accordingly, it is not necessary for a user to take action to establish the new service plan. FIG. 4 is a flow diagram illustrating one embodiment of upgrading (or downgrading) service at a wireless device 130.

Referring to FIG. 4, service adjustment information (e.g., upgrade or downgrade) is downloaded at data network 170, processing block 410. According to one embodiment, the service information is downloaded to data network 170 from server 103. However, in other embodiments, the service information may be downloaded from other sources, such as a third party server, or may be entered directly into a database associated with data network 170.

At processing block 420, data network 170 transmits a message to the wireless device 130 indicating that a new service plan has been established for the device 130. At processing block 430, the device 130 accesses data network 170 to ascertain the service adjustments. At processing block 440, information corresponding to the service change is transmitted from data network 170 to the wireless device 130. As a result, services are added to (or deleted from) wireless device 130. At processing block 450, routing connections at data network 170 are updated based upon the service change.

Figure 5:
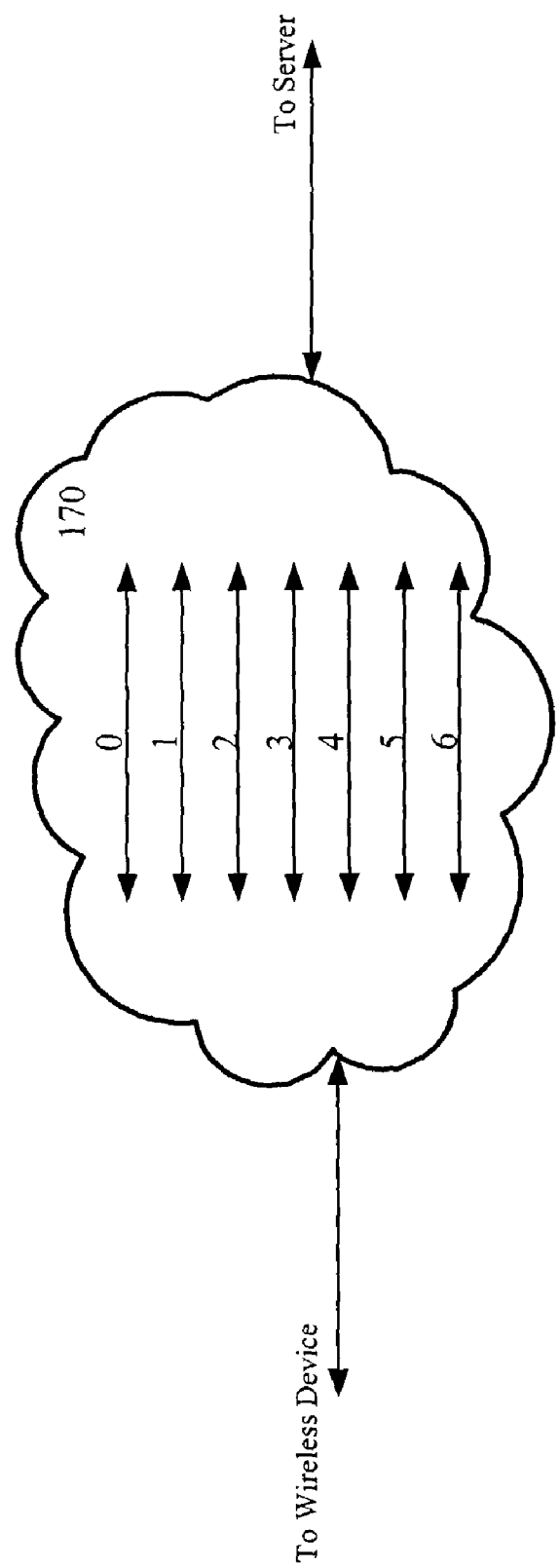
FIG. 5 illustrates another embodiment of data network connections between a wireless device and a server.

FIG. 5 illustrates one embodiment of data network 170 upgraded routing connections between a wireless device 130 and a server 103. Referring to FIG. 5, connections 4, 5 and 6 are added to connections 0-3. In one embodiment, connection 4 represents a second e-mail account, connection 5 represents a third email account and connection 6 represents a fax service.

Figure 6:
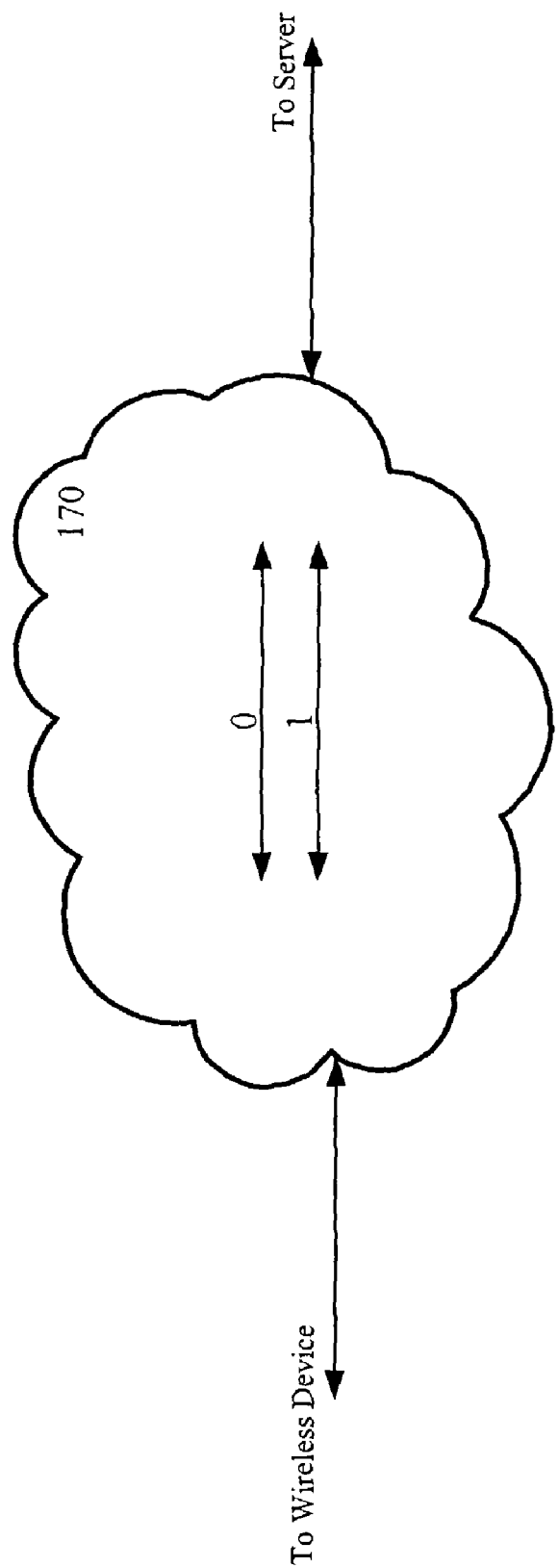
FIG. 6 illustrates yet another embodiment of data network connections between a wireless device and a server.

In a further embodiment, the additional e-mail accounts (e.g., connection 4 and connection 5) enable a user to access accounts having different e-mail addresses. FIG. 6 illustrates one embodiment of data network 170 downgraded routing connections between a wireless device 130 and a server 103. Referring to FIG. 6, connections 2 and 3 have been deleted, indicating that the service plan only authorizes one e-mail account in addition to the provisioning service.

Exemplary Computer System

Figure 7:
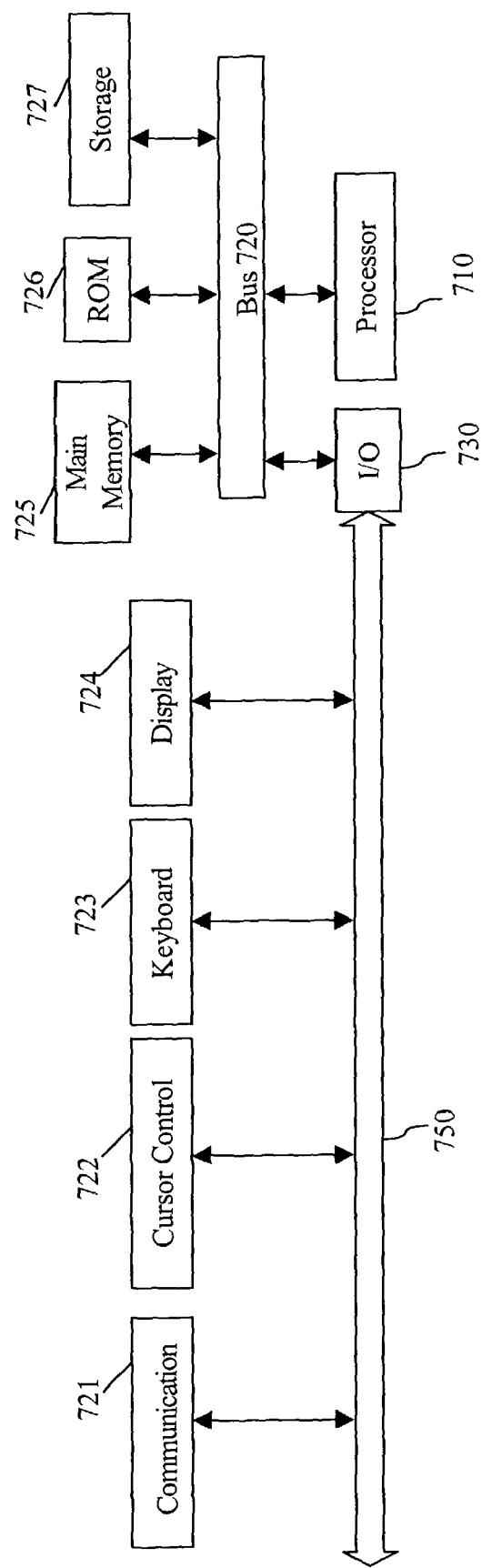
FIG. 7 illustrates one embodiment of a computer system.

FIG. 7 illustrates a computer system 700 on which wireless device 130 and or server 103 may be implemented. Computer system 700 includes a system bus 720 for communicating information, and a processor 710 coupled to bus 720 for processing information. According to one embodiment, processor 710 is implemented using one of the multitude of Motorola DragonBall MC68328-family of microprocessors. Nevertheless one of ordinary skill in the art will appreciate that other processors may be used.

Computer system 700 further comprises a random access memory (RAM) or other dynamic storage device 725 (referred to herein as main memory), coupled to bus 720 for storing information and instructions to be executed by processor 710. Main memory 725 also may be used for storing temporary variables or other intermediate information during execution of instructions by processor 710. Computer system 700 also may include a read only memory (ROM) and/or other static storage device 726 coupled to bus 720 for storing static information and instructions used by processor 710.

A data storage device 725 such as a magnetic disk or optical disc and its corresponding drive may also be coupled to computer system 700 for storing information and instructions. Computer system 700 can also be coupled to a second I/O bus 750 via an I/O interface 730. A plurality of I/O devices may be coupled to I/O bus 750, including a display device 724, an input device (e.g., an alphanumeric input device 723 and/or a cursor control device 722).

The communication device 721 is for accessing other computers (servers or clients) via network 170. The communication device 721 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while illustrated as an interface 100 to a service 102 executed on a server 103 (see FIG. 1), it will be appreciated that the underlying principles of the invention may be implemented on a single client in which the client transmits data over a network.

Moreover, although described in the context of a wireless data processing device, the underlying principles of the invention may be implemented to compress data in virtually any networking environment, both wired and wireless. Accordingly, the scope and spirit of the invention should be judged in terms of the claims which follow.

What is claimed is:

1. A method comprising:

receiving identification (ID) information from a messaging service at a data center to activate a wireless device for initial wireless data service between the messaging service and a wireless device;

the data center receiving ID information from the wireless device as a component of a first time request to connect with the messaging service;

activating wireless data service between the messaging service and the wireless device by establishing a first permanent connection to deliver a first type of message service, and a second permanent connection to deliver a second type of message service between the messaging service and the wireless device if the ID information received from the messaging service matches the ID information received from the wireless device.

2. The method of claim 1 wherein activating the wireless data service comprises the data center establishing first and second routing connections between the wireless device and the messaging service.

3. The method of claim 2 wherein each of the first and second routing connections correspond to a data service component authorized by the data center.

4. The method of claim 3 wherein the data center compares the ID information received from the wireless device to the ID information received from the messaging service to determine if the wireless device is authorized to connect with the messaging service.

5. The method of claim 1 wherein the ID information comprises serial number of the wireless device.

6. The method of claim 1 wherein each of the one or more routing connections are permanent.

7. The method of claim 6 wherein each of the one or more routing connections are private.

8. A system comprising:

a wireless device;

a messaging service to maintain data objects on behalf of a user; and a data center, coupled to the wireless device and the messaging service, to receive identification (ID) information from the messaging service to activate the wireless device for initial wireless data service between the messaging service and the wireless device, receive ID information from the wireless device as a. component of a first time request to connect with the messaging service, activate wireless data service between the messaging service and the wireless device by establishing a first permanent connection to deliver a first type of message service, and a second permanent connection to deliver a second type of message service between the messaging service and the wireless device if the ID information received from the messaging service matches the ID information received from the wireless device.

9. The system of claim 8 wherein the data center establishes a plurality of routing connections between the wireless device and the messaging service, each of plurality of connections corresponding to a data service level authorized by the data center.

10. The system of claim 9 wherein each of the plurality of routing connections are permanent.

11. The system of claim 10 wherein each of the one or more routing connections are private.

12. The system of claim 8 wherein the first routing connection represents an electronic mail (e-mail) service.

13. The system of claim 12 wherein the second routing connection represents a provisioning service, a third routing connection represents a calendar service and a fourth routing connection represents an address book service.

14. The system of claim 12 wherein a second routing connection represents a second e-mail service, and a third routing connection represents a third e-mail service.

15. The system of claim 14 wherein the first, second and third e-mail services each have a different address.

* * * * *